United States Patent Office 3,464,793
Patented Sept. 2, 1969

3,464,793
PROCESS FOR MAKING CARBON BLACK FROM CO
Merrill E. Jordan, Walpole, and William G. Burbine, Whitman, Mass., assignors to Cabot Corporation, Boston, Mass., a corporation of Delaware
Filed Dec. 27, 1966, Ser. No. 604,779
Int. Cl. C09c 1/48
U.S. Cl. 23—209.3                    3 Claims

ABSTRACT OF THE DISCLOSURE

The use of a reaction zone comprising a gas excited to form a thermal plasma in a process for preparing carbon black from carbon monoxide.

---

This invention relates to carbon black. More precisely the invention disclosed herein relates to a method for producing carbon blacks from a carbon monoxide (CO) feedstock and to the novel carbon products resulting therefrom.

Commercially carbon black is produced by the thermal decomposition of carbon containing materials which are usually essentially hydrocarbon in nature. The thermal decomposition of the carbonaceous material can be achieved by various processes such as open flame decomposition (impingement or channel), enclosed direct flame decomposition (furnace), externally heated surfaces (continuous thermal) or detonation or internal combustion processes (engine or energy utilizing systems), etc. In any of the above-mentioned processes, the temperatures involved rarely exceed about 3,000° F. The basic properties of a black, and therefore, the performance characteristics exhibited thereby in the application thereof, are determined in large measure by the particular process by which it is produced. For example, channel blacks or impingement type blacks, which are produced in the presence of air at temperatures of about 2,700° F., are generally characterized by high surface area, low structure, high volatile content and low pH, and are particularly suitable for use as coloring agents, and as reinforcing agents in natural rubber. On the other hand, carbon blacks, produced in an enclosed conversion zone at temperatures of about 2,500° F., e.g. by the furnace process, may be produced over a wide range of closely controlled particle sizes and accordingly are adaptable as fillers for various synthetic rubbers and plastics. In view of the many well-known applications for carbon blacks as finely divided fillers and/or pigments, any process which can insure the uniform production of novel carbon blacks having desirable properties would be a notable contribution to the art.

The principal object of the present invention is to provide a carbon product of new and unusual properties.

Another object of the present invention is to provide novel carbon blacks which are useful as fillers or pigments.

Another object of the present invention is to provide a new process for producing carbon blacks from carbon monoxide.

Other objectives of the present invention will in part be obvious and will in part appear hereinafter.

The above objects and advantages are obtained in accordance with the teachings of our invention essentially by decomposing carbon monoxide in an extremely high temperature zone created by ionization of a gas. More precisely and most preferably the objects and advantages of our invention are realized by continually introducing carbon monoxide into a zone wherein a gas is subjected to sufficient electrical energy to maintain the gas in a thermal plasma state.

For the purposes of the present invention the term "thermal plasma state" means that state obtained when a monatomic gas such as helium, neon, zenon, radon and most preferably argon, or a diatomic gas such as nitrogen, hydrogen, carbon monoxide, etc. is introduced to a zone at a pressure of about one atmosphere or higher and subjected to sufficient high frequency electrical energy in the zone so that from about 10 to about 50% of atoms therein are ionized. When such gases exist in the thermal plasma state, temperatures ranging from about 6,000° K. to about 20,000° K. or somewhat higher are established in portions of the plasma zone. Accordingly, the thermal plasma state is in decided contrast with conventional plasmas which are encountered in neon lights, etc., due to the extremely high temperatures involved in the former because of the higher pressure of gas present during the ionization thereof.

Many manners are known whereby monatomic or diatomic gases may be ionized to maintain same in the thermal plasma state. For example, the best-known method of initiating such a plasma is that wherein an AC or DC current of many thousands of amperes is passed through the gas occupying a region between two electrodes. Another method of producing a thermal plasma involves the use of the electrode type plasma torch in which the gas is passed around one of the electrodes and then permitted to pass through a hole in the second electrode thereby producing a plasma which may be directed outside the electrode zone. We have found that the most advantageous method of establishing the plasma state for the purposes of our invention is use of an electrodeless discharge technique. In accordance with this technique the thermal plasma state is achieved by heating the gas to ionization temperatures by means of electrical induction created preferably by a surrounding coil carrying radio frequency current. In accordance with the above-mentioned technique, a finite zone is established within the confines of the reactor wherein the monatomic gas, upon passing therethrough, will exist in the thermal plasma state. By adjusting and maintaining the flow rate of the gas and the input of power, the size of the zone wherein the gas exists in the plasma state may be modified and/or enlarged so that it effectively occupies a substantial cross-sectional portion of the reactor. Thus, the thermal plasma state is established and maintained at a precise location in the reactor, and hydrocarbons may be introduced directly thereto in a manner which insures the best contact conditions between the hydrocarbon and the high energy, thermal plasma. This preferred method of producing the thermal plasma state will be discussed and described in more detail hereinafter. It is to be understood however that the instant invention relates to the conversion of carbon monoxide to carbon black in a thermal plasma however generated.

Reference is made to the drawings in describing the process of the invention generally.

Figure 1:
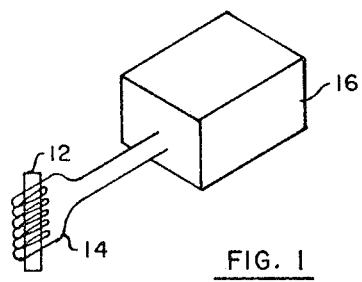
FIGURE 1 is a schematic perspective view of the apparatus of the invention.

Referring to FIGURE 1 it is seen that plasma reactor 12 is placed within coils 14. These coils have a high frequency alternating current controlled by high frequency radio field convertor 16.

Figure 3:
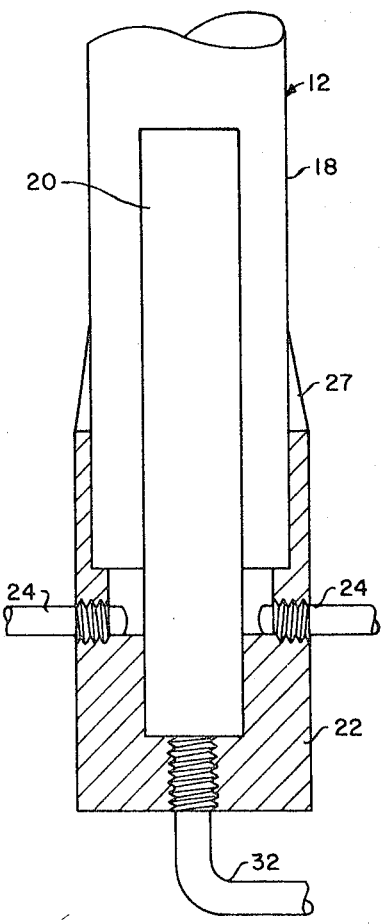
FIGURE 3 is a somewhat more detailed view of the plasma reactor, partly schematic and partly in section.

Referring now to FIGURE 3 it is seen that plasma reactor 12 comprises an outer tube 18 in an inner tube 20.

Tube 18 has a diameter of about 40 millimeters and a wall thickness of about 2 millimeters. Tube 20 has a diameter of about 20 millimeters and a wall thickness of about 2 millimeters. Both tubes are constructed of quartz. Base 22 is formed of a heat resistant material and is shaped to receive tubes 18 and 20 and tangentially-oriented pipes 24. Glass tape 27 or other such material is wound around base 22 with the junction of tube 18 to perfect the seal therebetween. An inert gas is fed into the reactor through pipes 24. Argon is a convenient gas for establishing the plasma required to carry out the process of the invention. In practice argon is first fed through pipes 24. The alternating current in coil 14 is brought up to a frequency of from 3 to 5 megacycles at a power output of 20 kilowatts from the high frequency convertor. A spark from a discharge device such as a Tesla coil, known to the art, is then activated adjacent to tube 18 just below coil 14. The discharge therefrom induces the initiation of a plasma in the argon gas mass. This plasma is at a very high temperature, i.e., about 20,000° K. or higher in the most active zones of the plasma. When the plasma is established, carbon monoxide is fed into the reactor via pipe 32.

Figure 2:
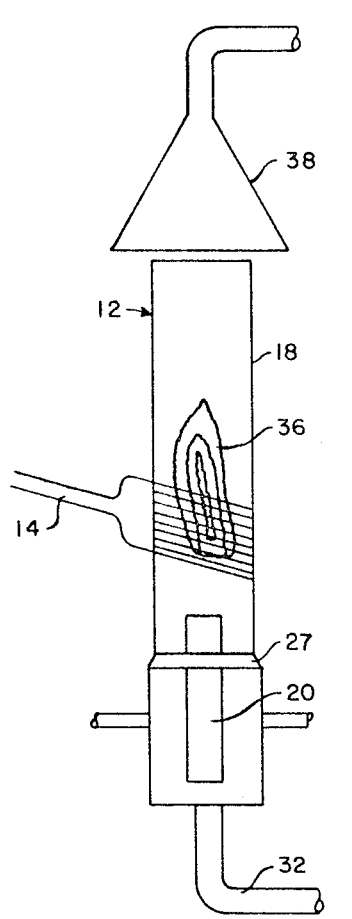
FIGURE 2 is a schematic and elevational view of the plasma reactor.

The approximate position of plasma zone 36 is indicated in FIGURE 2. Carbon black is carried up through zone 36 into recovery assembly 38.

When carbon monoxide itself is used as the gas to be activated for forming the plasma, it is usually preferable to initiate the plasma with another gas such as argon and then gradually replace the argon with the carbon monoxide.

The following working example is illustrative only and selected because it produces a particularly interesting carbon black:

EXAMPLE

In the apparatus described above, argon was introduced continually to the tube tangentially at a rate of about 14 cubic feet per hour. After establishing a thermal plasma zone within the confines of the reactor, carbon monoxide was introduced to the zone continually at a rate of about 2.2 ft.³/hr. The run continued for 1 hour. At the conclusion of the run, a quantity of carbon black was recovered from the collection system for analytical testing.

The surface area of the black, as measured by nitrogen absorption was 23 meters$^2$ per gram. X-ray diffraction patterns of the black revealed no trace of graphitization and that the L$a$ dimension was 78 angstroms while the L$c$ dimension was 56 angstroms. Accordingly, the ratio of L$a$ to L$c$ was about 1.4.

Although the process of the invention is capable of providing extraordinarily non-reactive blacks having low moisture absorption characteristics, low moisture surface area and unusual morphology particularly low in edge sites as indicated by a low L$a$ to L$c$ ratio, the process can also produce a wide variety of blacks by changing the dwell-time of CO and its degradation products in the plasma zone or the part of the zone into which the CO is fed.

What is claimed is:

1. A process for making carbon black comprising (a) electrically inducing the heating of a stream of gas to a thermal plasma state of at least about one atmosphere pressure wherein from about 10 to about 50% of said gas is in an ionized state, thereby forming a zone suitable for carrying out high temperature reactions and (b) continuously feeding carbon monoxide into said zone thereby causing the decomposition of said carbon monoxide to form carbon black.

2. A process as defined in claim 1 wherein said gas is an inert monatomic gas.

3. A process as defined in claim 1 wherein said gas is carbon monoxide.

References Cited
UNITED STATES PATENTS

| | | | |
|---|---|---|---|
| 1,812,230 | 6/1931 | Aarts | 23—209.5 X |
| 1,904,585 | 4/1933 | Willekens | 23—209.5 |
| 3,331,664 | 7/1967 | Jordan | 22—209.3 |
| 3,342,554 | 9/1967 | Jordan et al. | 23—209.2 |

EDWARD J. MEROS, Primary Examiner

U.S. Cl. X.R.

23—209.2; 204—173